(12) United States Patent
Axnäs et al.

(10) Patent No.: US 10,284,403 B2
(45) Date of Patent: May 7, 2019

(54) TRANSMISSION OF A SIGNAL ACCORDING TO A SINGLE- OR MULTI-CARRIER MODULATION SCHEME

(71) Applicant: Telefonaktiebolaget LM Ericsson (publ), Stockholm (SE)

(72) Inventors: Johan Axnäs, Solna (SE); Kumar Balachandran, Pleasanton, CA (US); Dennis Hui, Sunnyvale, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 25 days.

(21) Appl. No.: 15/528,671

(22) PCT Filed: Oct. 30, 2015

(86) PCT No.: PCT/SE2015/051147
§ 371 (c)(1),
(2) Date: May 22, 2017

(87) PCT Pub. No.: WO2016/085381
PCT Pub. Date: Jun. 2, 2016

(65) Prior Publication Data
US 2017/0272298 A1    Sep. 21, 2017

Related U.S. Application Data

(60) Provisional application No. 62/083,341, filed on Nov. 24, 2014.

(51) Int. Cl.
*H04L 29/06* (2006.01)
*H04L 12/801* (2013.01)
(Continued)

(52) U.S. Cl.
CPC ........ *H04L 27/2613* (2013.01); *H04L 5/0044* (2013.01); *H04L 27/2601* (2013.01);
(Continued)

(58) Field of Classification Search
CPC . H04L 27/2613; H04L 69/22; H04L 27/2601; H04L 27/265
See application file for complete search history.

(56) References Cited

U.S. PATENT DOCUMENTS

2008/0170633 A1   7/2008   Karino
2010/0027512 A1   2/2010   Kishiyama et al.
(Continued)

FOREIGN PATENT DOCUMENTS

GB   2 424 805 A1   10/2006
WO   2008007375 A2   1/2008
(Continued)

OTHER PUBLICATIONS

International Search Report and Written Opinion dated Mar. 22, 2016 for International Application Serial No. PCT/SE2015/051147, International Filing Date: Oct. 30, 2015 consisting of 13-pages.
(Continued)

*Primary Examiner* — Faruk Hamza
*Assistant Examiner* — Abusayeed M Haque
(74) *Attorney, Agent, or Firm* — Patent Portfolio Builders, PLLC

(57) ABSTRACT

A method performed by a communication node for transmission of a signal according to a single- or multiple carrier modulation scheme in a wireless communications network. The communication node modulates at least a first part of the signal into at least a first symbol with a shorter duration than a complete symbol according to the modulation scheme. The communication node modulates at least a second part of the signal into at least a second symbol with a shorter duration than a complete symbol according to the modulation scheme. The duration of the at least first and second symbols are equal to the duration of a complete symbol according to the carrier modulation scheme. Then, the communication (Continued)

---

501. Modulating at least a 1st part of the signal into at least a 1st symbol with a shorter duration than a complete symbol according to a single- or multiple carrier modulation scheme

↓

502. Modulating at least a 2nd part of the signal into at least a 2nd symbol with a shorter duration than a complete symbol according to the single- or multiple carrier modulation scheme

↓

503. Providing at least one of the at least first and second symbol with a robust coding protection

↓

504. Transmitting the at least 1st and 2nd second symbol as a complete symbol according to the single- or multiple carrier modulation scheme without time domain separation node transmits the at least first and second symbol as a complete symbol according to the modulation scheme without time domain separation.

17 Claims, 7 Drawing Sheets

(51) Int. Cl.
| | | |
|---|---|---|
| *H04B 1/50* | (2006.01) | |
| *H04L 12/835* | (2013.01) | |
| *H04L 27/26* | (2006.01) | |
| *H04L 5/00* | (2006.01) | |
| *H04B 7/06* | (2006.01) | |
| *H04L 1/00* | (2006.01) | |

(52) U.S. Cl.
CPC ........ *H04L 27/2602* (2013.01); *H04L 27/265* (2013.01); *H04L 69/22* (2013.01); *H04B 7/0695* (2013.01); *H04L 1/00* (2013.01)

(56) References Cited

U.S. PATENT DOCUMENTS

| | | | | |
|---|---|---|---|---|
| 2010/0309775 A1* | 12/2010 | Muharemovic | ..... | H04J 13/0062 370/210 |
| 2011/0013615 A1* | 1/2011 | Lee, II | ......... | H04L 5/0023 370/344 |
| 2011/0292895 A1* | 12/2011 | Wager | ........ | H04L 5/0007 370/329 |
| 2011/0310835 A1 | 12/2011 | Cho et al. | | |
| 2012/0087393 A1 | 4/2012 | Jeong et al. | | |
| 2012/0113904 A1* | 5/2012 | Anderson | ......... | H04W 76/28 370/329 |
| 2012/0113905 A1* | 5/2012 | Anderson | ......... | H04W 76/38 370/329 |
| 2012/0127934 A1* | 5/2012 | Anderson | ........ | H04W 72/0406 370/329 |
| 2012/0287874 A1 | 11/2012 | Oketani | | |
| 2013/0077595 A1* | 3/2013 | Aiba | ............ | H04L 1/0041 370/329 |
| 2013/0279614 A1 | 10/2013 | Walton et al. | | |
| 2014/0003544 A1 | 1/2014 | Oketani et al. | | |
| 2014/0079016 A1* | 3/2014 | Dai | ............ | H04L 5/0041 370/330 |
| 2014/0106740 A1 | 4/2014 | Zhou et al. | | |
| 2014/0153420 A1 | 6/2014 | Garin et al. | | |
| 2014/0286269 A1* | 9/2014 | Stanwood | ......... | H04W 24/02 370/329 |

FOREIGN PATENT DOCUMENTS

| | | |
|---|---|---|
| WO | 2009014764 A1 | 1/2009 |
| WO | 2014121833 A1 | 8/2014 |

OTHER PUBLICATIONS

3GPP TSG RAN WG1 #51, R1-074678, Jeju, Korea, Source: Texas Instruments, Title: Uplink Reference Signals in Support of High-Speed UEs, Agenda Item: 6.2.2, Document for: Discussion/Decision, Conference Location and Date: Jeju, Korea, Nov. 5-9, 2007 consisting of 6-pages.

Extended European Search Report received in corresponding Application No. 15863110.1, dated Aug. 29, 2018. The reference not cited therein has been previously made of record.

Partial European Search Report received in corresponding Application No. 15863110.1, dated May 22, 2018. The reference not cited therein has been previously made of record.

* cited by examiner

TRANSMISSION OF A SIGNAL ACCORDING TO A SINGLE- OR MULTI-CARRIER MODULATION SCHEME

CROSS-REFERENCE TO RELATED APPLICATIONS

This application is a Submission Under 35 U.S.C. § 371 for U.S. National Stage Patent Application of International Application Number: PCT/SE2015/051147, filed Oct. 30, 2015 entitled "TRANSMISSION OF A SIGNAL ACCORDING TO A SINGLE- OR MULTI-CARRIER MODULATION SCHEME," which claims priority to U.S. Provisional Application No. 62/083,341, filed Nov. 24, 2014, entitled "COMMUNICATION NODE AND METHOD THEREIN FOR TRANSMISSION OF A SIGNAL ACCORDING TO A SINGLE-OR MULTI-CARRIER MODULATION SCHEME IN A WIRELESS COMMUNICATION NETWORK," the entirety of both which are incorporated herein by reference.

TECHNICAL FIELD

Embodiments herein relate to signal transmission in a wireless communications network. In particular, embodiments herein relate to a communication node and a method therein for transmission of a signal according to a single- or multiple carrier modulation scheme in a wireless communications network. The communication node may be a wireless device or a network node in the wireless communication network.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station or network node, e.g. a radio base station, RBS, which in some networks may also be referred to as, for example, "NodeB", "eNB" or "eNodeB".

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations/network nodes connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat architecture comprising radio base station nodes without reporting to RNCs.

Orthogonal Frequency Division Multiplexing, OFDM, is a frequently used modulation scheme in modern wireless communication networks. A major reason for its popularity is the orthogonality it provides; that is, two different resource elements, REs, such as, for example, two different QAM symbols, do not interfere with each other as long as the channel delay spread is shorter than the Cyclic Prefix, CP. The channel delay spread refers to the time span of the channel impulse response, i.e. how much a transmitted delta pulse has been spread out in time when it reaches the receiver.

An example of a frame structure for such an OFDM modulation scheme is illustrated in FIG. 1. FIG. 1 shows a system subframe, i.e. the minimum scheduling unit in time employed in the wireless communication network. Here, the system subframe is exemplified as comprising 4 complete OFDM symbols. It also shows REs for each complete OFDM symbol and subcarrier. The duration of a complete OFDM symbol is denoted $T_{OFDM}$, and the duration of the Cyclic Prefix, CP, is denoted $T_{CP}$.

In particular, OFDM allows for using an arbitrarily small or large subset of the REs for transmitting reference signal information, i.e. reference symbols, RSs, which also may be referred to as pilots or pilot symbols. The number of RSs may hence be chosen so as to carefully balance the need for RSs, which are used to achieve a good channel estimation performance, against the desire to minimize RS overhead signalling. This is also true for several other multi-carrier modulation schemes, such as, e.g. Filter-Bank Multi-Carrier, FBMC, modulation. However, in some important uses of OFDM-based modulation scheme, it is not possible to have a fine-granular control over the amount of RSs, which may possibly result in a large RS signalling overhead.

A first example is DFT-spread OFDM modulation. Here, Quadrature Amplitude Modulation, QAM, symbols are subjected to a Discrete Fourier Transform, DFT, before being modulated using OFDM modulation. In this case, each RE carries a linear combination of all QAM symbols in the OFDM symbol, and replacing individual REs by RSs is not possible without severely disturbing all data in the OFDM symbol. Furthermore, replacing individual QAM symbols before the DFT is also not viable in this case, since the inter-symbol interference is then large. Although this inter-symbol interference may be significantly reduced by equalization, but in order to perform the equalization, accurate channel estimation based on the RSs first has to be performed. This in turn depends on non-interfered RSs. Hence, instead an entire OFDM symbol will have to carry only RSs.

As illustrated in FIG. 1, it follows that if the system subframe, i.e. the minimum scheduling unit in time employed in the wireless communication network, is only a few OFDM symbols, e.g. four as in FIG. 1, and each system subframe must contain RSs, i.e. which is the normal typical case in order to enable reliable demodulation, then the RS signalling overhead will be large, i.e. in this example the RS signalling will be about ¼ or 25%.

A second example is when performing spatial beamforming, BF, with a multi-antenna transmitter under certain common hardware constraints. More precisely, if there is only one digital transmit chain, e.g. for cost and power consumption reasons, and the beamforming is performed using only analog full-bandwidth phase shifters at the individual antenna elements, then each OFDM symbol may only transmit a signal in one spatial direction. This is an issue since it means that the search for the best beam direction to use for data transmission, i.e. a scan over all beam directions which may comprise e.g. possibly hundreds of potential beam directions, only may be performed at a rate of one direction per OFDM symbol. This means that no data transmission may take place on those OFDM symbols. Hence, the result is a very large RS signalling overhead.

SUMMARY

It is an object of embodiments herein to reduce overhead signalling in a wireless communication network.

According to a first aspect of embodiments herein, the object is achieved by a method performed by a communication node for transmission of a signal according to a single- or multiple carrier modulation scheme in a wireless communications network. The communication node modulates at least a first part of the signal into at least a first symbol with a shorter duration than a complete symbol according to the single- or multiple carrier modulation scheme. Also, the communication node modulates at least a second part of the signal into at least a second symbol with a shorter duration than a complete symbol according to the single- or multiple carrier modulation scheme. Here, the duration of the at least first and second symbols are equal to the duration of a complete symbol according to the single- or multiple carrier modulation scheme. Then, the communication node transmits the at least first and second symbol as a complete symbol according to the single- or multiple carrier modulation scheme without time domain separation.

According to a second aspect of embodiments herein, the object is achieved by a communication node for transmission of a signal according to a single- or multiple carrier modulation scheme in a wireless communications network. The communication node is configured to modulate at least a first part of the signal into at least a first symbol with a shorter duration than a complete symbol according to the single- or multiple carrier modulation scheme. Also, the communication node modulate at least a second part of the signal into at least a second symbol with a shorter duration than a complete symbol according to the single- or multiple carrier modulation scheme, wherein the duration of the at least first and second symbols are equal to the duration of a complete symbol according to the single- or multiple carrier modulation scheme. Then, the communication node transmit the at least first and second symbol as a complete symbol according to the single- or multiple carrier modulation scheme without time domain separation.

The communication node may be a wireless communication device or a network in a wireless communications network.

By having a communication node as described in the embodiments above, the overhead signalling associated with reference signal information or reference signalling in the wireless communication network is reduced without disrupting time alignment. Hence, overhead signalling in the wireless communication network is reduced.

BRIEF DESCRIPTION OF THE DRAWINGS

Embodiments will now be described in more detail in relation to the enclosed drawings.

DETAILED DESCRIPTION

Figure 1:
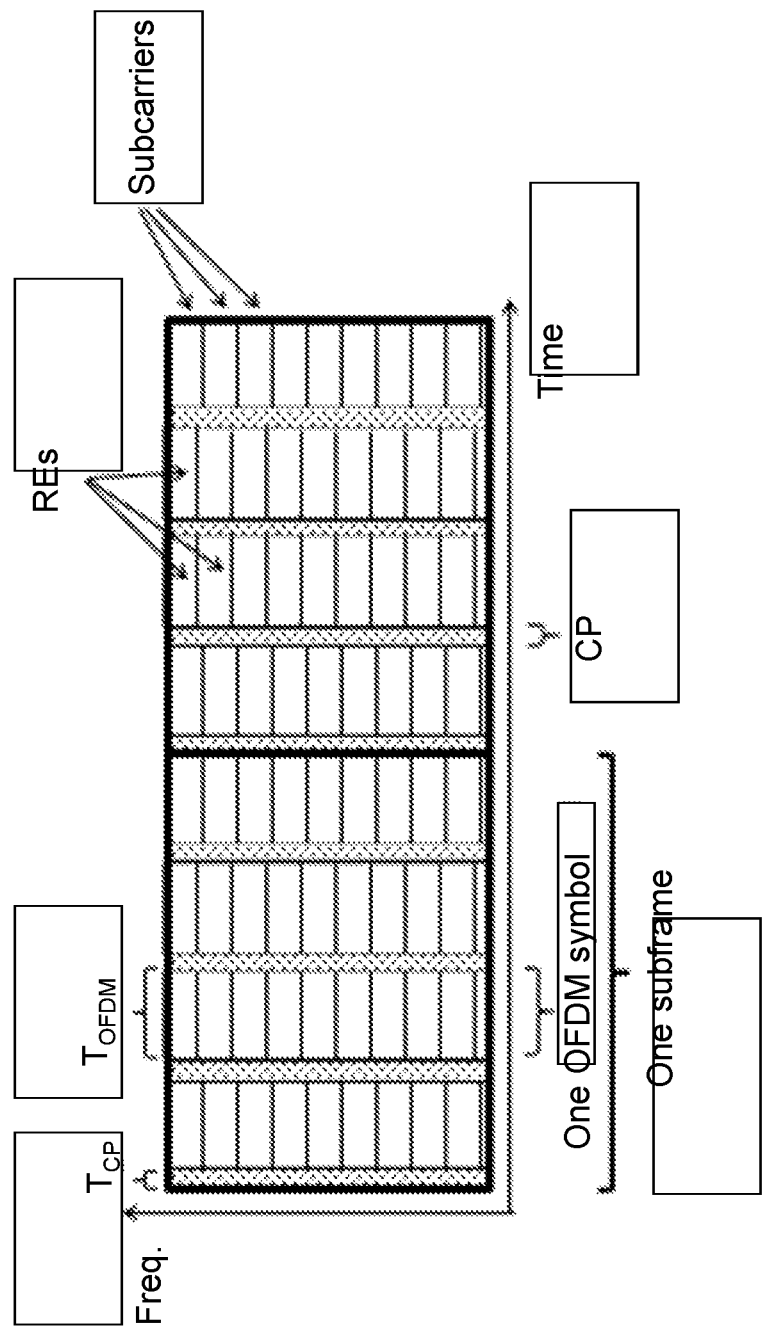
FIG. 1 is a schematic block diagram depicting an example of a frame structure in an OFDM-based wireless communication network.

The figures herein are schematic and simplified for clarity, and they merely show details which are essential to the understanding of the embodiments presented herein, while other details have been left out. Throughout, the same reference numerals are used for identical or corresponding parts or steps.

Figure 2:
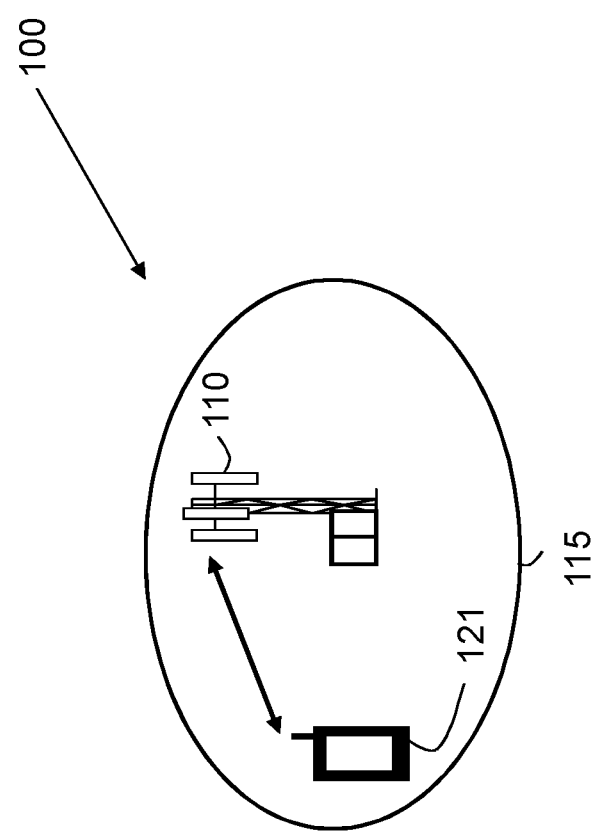
FIG. 2 is a schematic block diagram illustrating embodiments of communication nodes in a wireless communications network.

FIG. 2 depicts a wireless communications network 100 in which embodiments herein may be implemented. In some embodiments, the wireless communications network 100 may be a radio communications network such as a Long Term Evolution (LTE) network. Although, the radio communication network is exemplified herein as an LTE network, the radio communications network may also employ technology of any one of LTE-Advanced, Wideband Code Division Multiple Access (WCDMA), Global System for Mobile communications/Enhanced Data rate for GSM Evolution (GSM/EDGE), Worldwide Interoperability for Microwave Access (wiMax), Ultra Mobile Broadband (UMB) or GSM, or any other similar cellular network or system. The wireless communications network 100 may also be an Ultra Dense Network, UDN, which e.g. may transmit on millimeter-waves (mmW).

The radio communications system 100 comprises a network node 110. The network node 110 serves at least one cell 115. The network node 110 may correspond to any type of radio network node or any network node, which communicates with a wireless communication device and/or with another network node, such as, e.g. be a base station, a radio base station, eNB, eNodeB, a Home Node B, a Home eNode B, femto Base Station (BS), pico BS, etc. Further examples of the network node 110 may also be e.g. a repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 115 uniquely in the whole radio communication network 100 is also broadcasted in the cell 115. The network node 110 communicates over the air or radio interface operating on radio frequencies with the UEs within range of the network node 110.

In FIG. 2, a wireless communication device 121 is located within the cell 115. The wireless communication device 121 is configured to communicate within the radio communications network 100 via the network node 110 over a radio link 131 when present in the cell 115 served by the network node 110. The wireless communication device 121 may refer to any type of communication device or user equipment (UE) communicating with a network node and/or with another communication device in a cellular, mobile or radio communication network or system. Examples of such a wireless communication device are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc.

As part of the developing of the embodiments described herein, a problem will first be identified and discussed.

Figure 3:
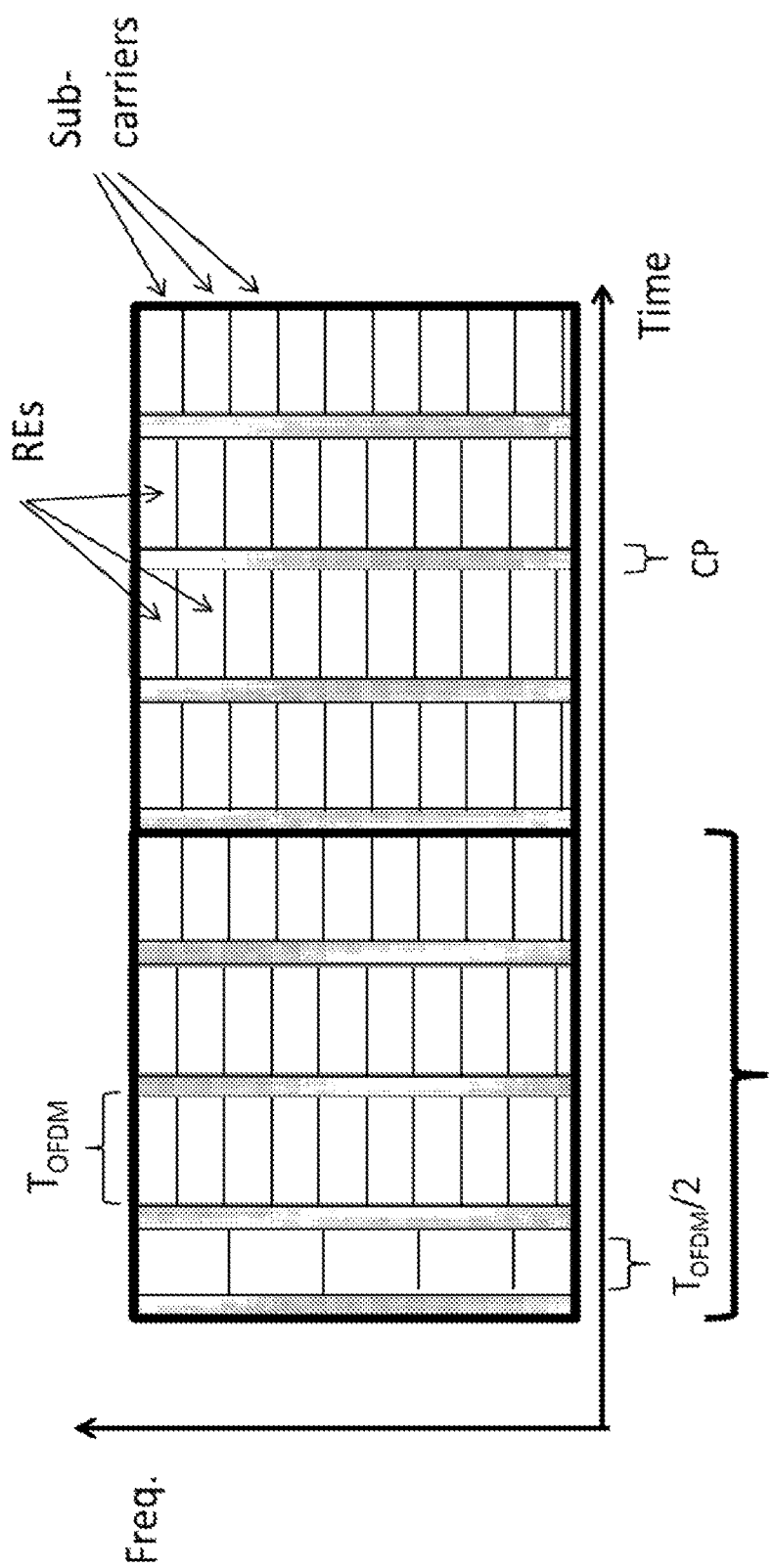
FIG. 3 is a schematic block diagram depicting another example of a frame structure in an OFDM-based wireless communication network.

When attempting to reduce overhead signalling in a wireless communication network, one solution is to replace at least one OFDM symbol in each system subframe, or occasional system subframe, by an OFDM symbol with a shorter duration than a complete or "normal" OFDM symbol, as illustrated in FIG. 3. This means that if such a short-duration OFDM symbol is used for reference signal information, i.e. reference symbols, RSs, in each subframe, the resulting RS signalling overhead in each subframe may be relatively small, i.e. an overhead that is less than when using a complete OFDM symbol for the RS signalling. Also, although the Cyclic Prefix, CP, signalling overhead in this short-duration OFDM symbol becomes larger relatively, i.e. the CP duration may be considered fixed as it should accommodate the channel delay spread, the increase in the total CP overhead for the multiple OFDM symbols in the system subframe is still small.

An issue with this solution, however, is that it will obviously make one of the OFDM symbols shorter, as seen in FIG. 3. This will disrupt the consistency of the OFDM symbols and the time alignment in the wireless communication network; at least when the number of short-duration OFDM symbols in each subframe or frame may vary differently in different links of the wireless communication network. This misalignment in (sub)frame time is undesirable, since it for example may lead to inter-(sub)frame interference, inter-OFDM-symbol interference, and inter-subcarrier interference in case of OFDM modulation. It will also cause the radio resources to be less orthogonal and, for example, prevent an efficient Frequency-Domain Multiple Access, FDMA.

Figure 4:
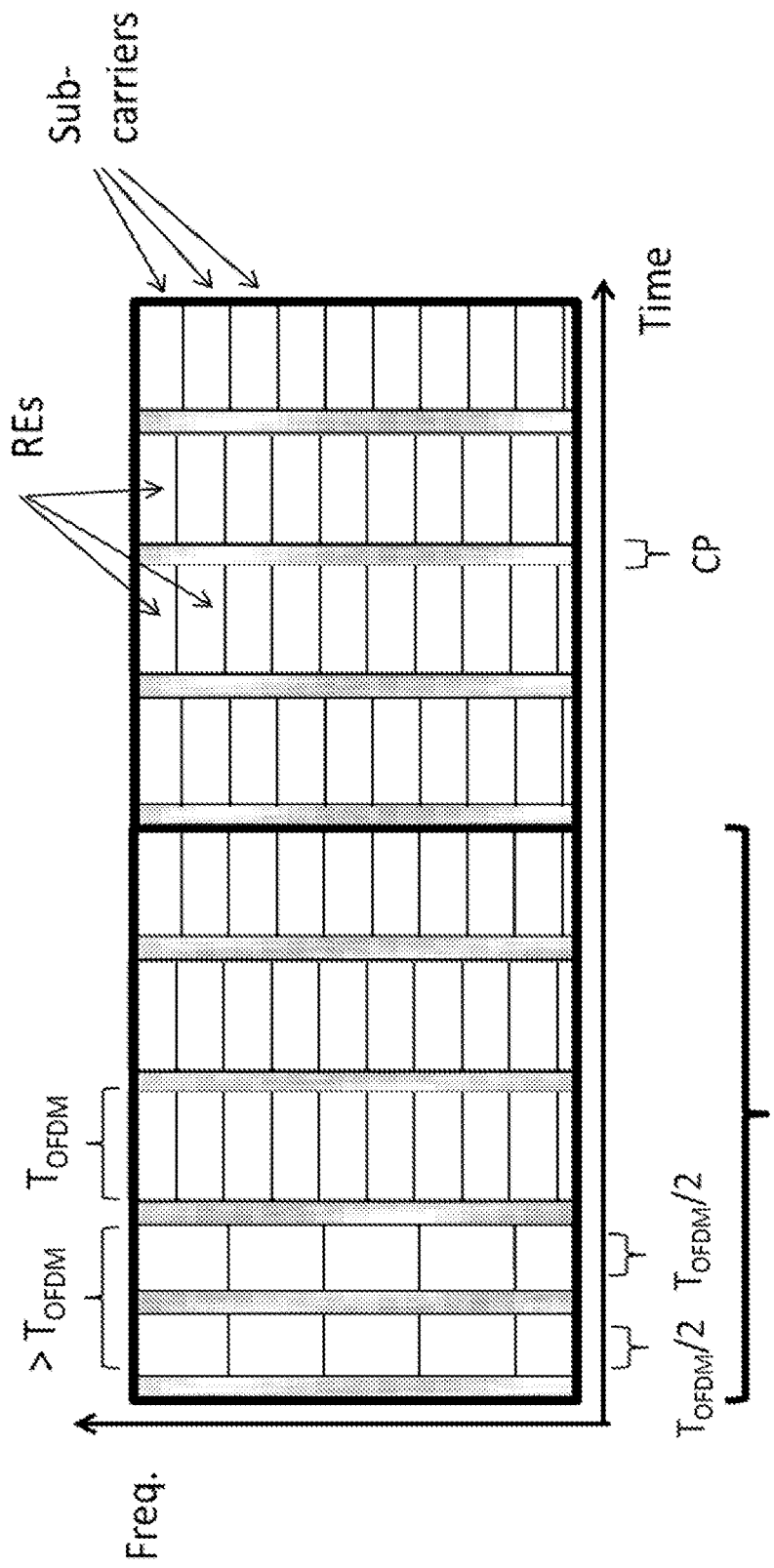
FIG. 4 is a schematic block diagram depicting of a further example of a frame structure in an OFDM-based wireless communication network.

One way to deal with this issue may seem to be to instead use two short-duration OFDM symbols, wherein each of which has exactly half the duration as a complete OFDM symbol, as illustrated in FIG. 4. However, because of the extra Cyclic Prefix, CP, this way will still lead to time misalignment since the (sub)frame will be extended, i.e. become longer as seen in FIG. 4.

Here, it may further seem that this may be avoided by just slightly adjusting the duration of one or both of the short-duration OFDM symbols, so that the two short-duration OFDM-symbols together have the duration of a complete OFDM symbol including cyclic prefixes, CPs, of both OFDM symbols. However, the ratio between the duration of the complete and short-duration OFDM symbols excluding CP is then no longer an integer factor, which means that the OFDM subcarrier spacing is no longer an integer factor. An integer factor is desirable in order to be able to reuse hardware accelerators between complete and short-duration OFDM symbols. The integer factor for subcarrier spacing may also be desirable from the perspective of preventing unnecessary inter-subcarrier interference between short-duration OFDM symbols and complete, i.e. normal duration, OFDM symbols.

These issues are addressed by the embodiments presented herein, which reduces the overhead signalling associated with reference signal information in the wireless communication network without disrupting the time alignment in the wireless communication network.

Figure 5:
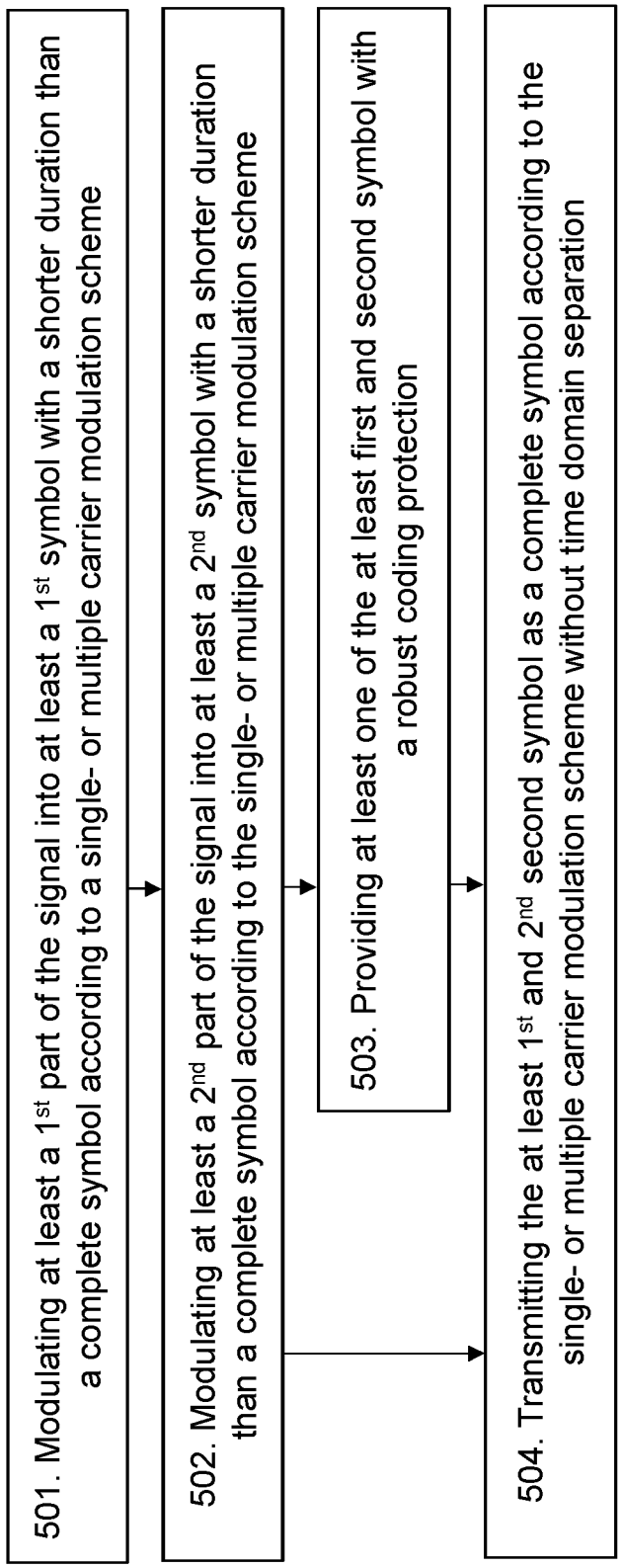
FIG. 5 is a flowchart depicting embodiments of a method in a communication node.

Example of embodiments of a method performed by a communication node 121, 110 for transmission of a signal according to a single- or multiple carrier modulation scheme in a wireless communications network 100, will now be described with reference to the flowchart depicted in FIG. 5. FIG. 5 illustrates an example of actions or operations which may be taken by the communication node 121, 110.

It should be noted that although the following description of the embodiments herein may use the term "OFDM", the same embodiments may also be applied to most multi-carrier modulation techniques, such as, e.g. a Filter-Bank Multi-Carrier, FBMC, modulation scheme. Furthermore, the embodiments described for DFT-spread OFDM may also be applied to other single-carrier-like modulation schemes with cyclic prefix, such as, e.g. a Single-Carrier Frequency-Division Multiple Access (SC-FDMA) modulation scheme, and in general to most pre-coded multi-carrier modulation schemes.

Actions 501-502

First, the communication node 121, 110 modulates at least a first part of the signal into at least a first symbol with a shorter duration than a complete symbol according to the single- or multiple carrier modulation scheme. The communication node 121, 110 also modulates at least a second part of the signal into at least a second symbol with a shorter duration than a complete symbol according to the single- or multiple carrier modulation scheme. Here, the duration of the at least first and second symbols are equal to the duration of a complete symbol according to the single- or multiple carrier modulation scheme.

Figure 6:
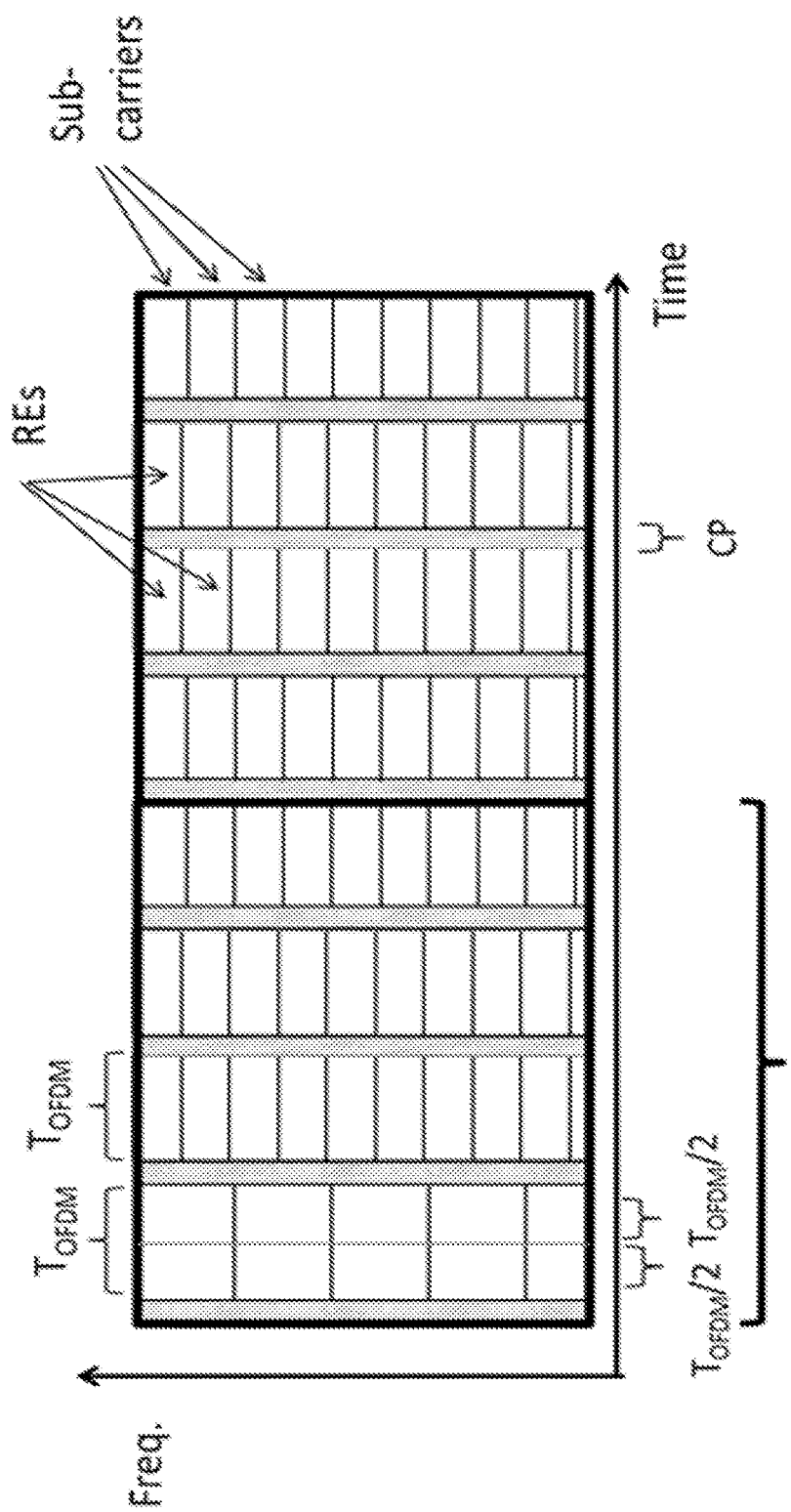
FIG. 6 is a schematic block diagram depicting an example of a frame structure according to embodiments of a method and communication node in a wireless communication network.

As shown in FIG. 6, this means, for example, that a normal OFDM symbol is replaced with two shorter OFDM symbols but without a cyclic prefix therein between. In this way, the two short OFDM symbols will be exactly as long as a normal OFDM symbol when all cyclic prefixes are included.

In some embodiments, guard intervals separating complete symbols according to the single- or multiple carrier modulation scheme in the time domain may be a null-fix, e.g. a set of zero-valued samples or true guard period. Using a null-fix rather than a cyclic prefix, CP, in this manner is particularly advantageous since it, for example, has the following two advantages:

The prefix of the first short OFDM symbol may alternatively be seen as a prefix of the concatenation of the two short OFDM symbols (since all null-fixes are identical), making the two short OFDM symbols appear, to other links in the wireless communication system 100 that it interferes with, as a normal OFDM symbol, i.e. there will be no inter-subcarrier interference.

It makes it possible to recover power from the second short OFDM symbol that has leaked into the prefix of the following normal OFDM symbol, i.e. interpreting the null-fix as a postfix.

In some embodiments, the complete OFDM symbol may further be split into further shorter OFDM symbols, i.e. more than a first and a second symbol, where these three or more shorter OFDM symbols also do not have a cyclic prefix therein between.

In some embodiment, the two or more shorter OFDM symbols, i.e. the at least first and second symbol, do not necessarily all have to have the same duration, in this case the advantage of the integer factor may be lost.

Action 503

In some embodiments, the communication node 121, 110 may provide at least one of the first and second symbol with a robust coding protection. Optionally, the communication node 121, 110 may provide at least the first symbol with a robust coding protection. Because of the lack of cyclic prefix between the two shorter OFDM symbols, some of the power of the first short OFDM symbol will leak into the second short OFDM symbol due to the delay spread of the channel. However, if the first short OFDM symbol has robust coding protection, it may be decoded and canceled from the second short OFDM symbol. This means that it may be decoded and canceled, i.e. subtracted from a received signal, before detection of the second short OFDM symbol is attempted.

According to another option, the communication node 121, 110 may provide the second symbol with a robust coding protection. In this case, the power of the first short OFDM symbol that may leak into the second short OFDM symbol will not matter much, since the decoding of the second short OFDM symbol is protected by its robust coding.

Action 504

After the modulation, the communication node 121, 110 transmits the at least first and second symbol as a complete symbol according to the single- or multiple carrier modulation scheme without time domain separation.

In some embodiments, the first and second parts of the signal comprise reference signal information. This means that the at least first symbol and the at least second symbol may comprise reference signal information. This may advantageously be useful to enable scanning of more beam directions in a limited amount of time, since only one beam direction can normally be scanned in each OFDM symbol. Thus, by splitting every symbol into two symbols, twice as many directions may be scanned. It may be noted that some solution might also solve this problem, but at the expense of disrupting system frame structure timing or increasing hardware complexity. Here, it is solved without these drawbacks.

Alternatively, in some embodiments, the first part of the signal comprises reference signal information and the second part of the signal comprises data and/or control information. This means that the at least first symbol may comprise reference signal information and the at least second symbol may comprise data and/or control information. Here, according to some embodiments, the reference information may be reference signal information associated with beam scanning, such as, beam scanning reference symbols, and the control information may be system information, such as, e.g. a system or network node index. This means, for example, that the first short OFDM symbol may comprise beam scanning RSs, and the second short OFDM symbol contains system information, e.g. a system index, or an access node index, etc. Since the decoding of the system information is anyway only meaningful if the beam scanning RSs have been correctly detected, the cancellation should in this case not decrease overall performance.

In some embodiments, both the first and second symbol may comprise control information.

It should further be noted that a modulation scheme is herein understood to refer to schemes such as OFDM, DFTS-OFDM, FBMC, etc., which may be also referred to as "multiplexing schemes", and not to so-called constellation types such as BPSK, QPSK, 16QAM, etc.

Furthermore, beamforming may be applied to any tx signal, i.e. transmission signal, as well as to any rx signal, i.e. reception signal. Different beamforms may target the same communication node or, more often, different communication nodes. Beamforming may be achieved using different antennas directed in different spatial directions, or using the same, or partly overlapping, sets of multi-antenna elements with different precoder settings, that is, different precoder weights. Beamforms are in general not restricted to a single narrow lobe, but may have more complex shapes, depending on the precoder. The precoders are typically linear, in which case they may be described in terms of a set of precoder weights, but may in principle also be non-linear.

To perform the method actions herein a communication node 110, 121 in the form of a wireless device 121 and a network node 110 are provided.

Figure 8:
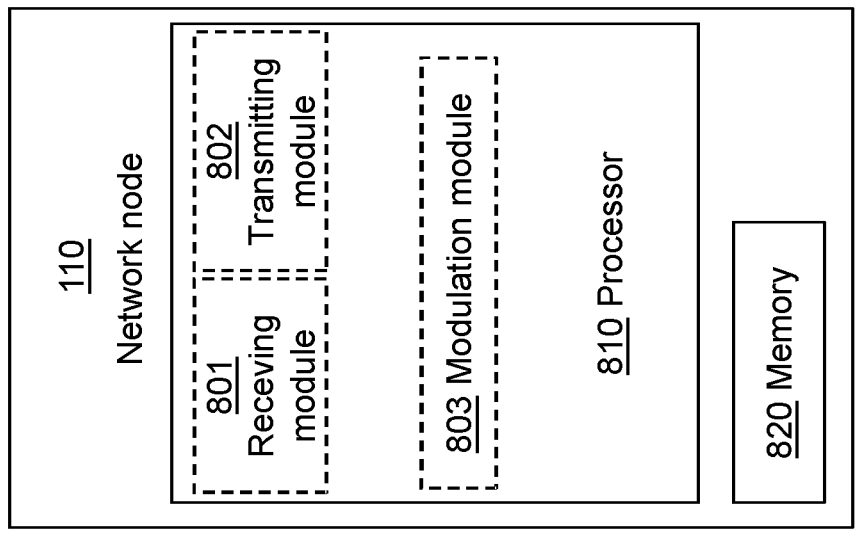
FIG. 8 is a schematic block diagram depicting embodiments of a communication node, i.e. a network node.
Figure 7:
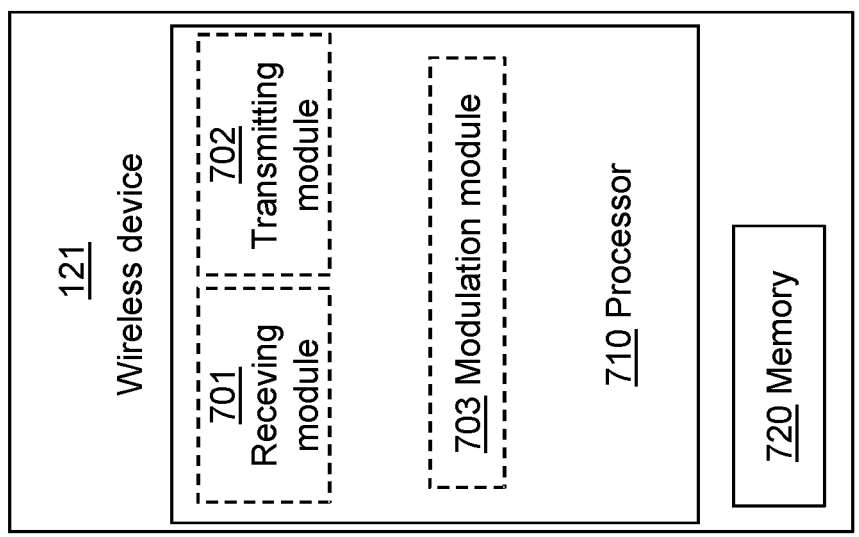
FIG. 7 is a schematic block diagram depicting embodiments of communication node, i.e. a wireless communication device.

FIGS. 7-8 are a block diagrams depicting the wireless device 121 and the network node 110. The wireless device 121 is configured to perform the methods described for a communication node according to embodiments herein. The network node 110 is also configured to perform the methods described for a communication node according to embodiments herein.

The embodiments herein for transmission of a signal according to a single- or multiple carrier modulation scheme in a wireless communications network 100 may be implemented through one or more processors 710 in the wireless device 121 depicted in FIG. 7, together with computer program code for performing the functions and/or method actions of the embodiments herein. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121.

The wireless device 121 comprises a receiving module 701, or receiver RX, and a transmitting module 702, or transmitter TX, over which the wireless device 121 may transmit/receive signals to other communication nodes, such as, e.g. the network node 110 or other wireless devices or network nodes. Also, the wireless device 121 may comprise a modulation module 703 for performing the transmission of a signal according to a single- or multiple carrier modulation scheme in a wireless communications network 100 according to the embodiments herein.

Hence, the wireless device 121 or processing circuitry 710 is configured to, or may comprise the modulation module 703 configured to, modulate at least a first part of the signal into at least a first symbol with a shorter duration than a complete symbol according to the single- or multiple carrier modulation scheme. Also, the wireless device 121 or processing circuitry 710 is configured to, or may comprise the modulation module 703 configured to, modulate at least a second part of the signal into at least a second symbol with a shorter duration than a complete symbol according to the single- or multiple carrier modulation scheme, wherein the duration of the at least first and second symbols are equal to the duration of a complete symbol according to the single- or multiple carrier modulation scheme. Further, the wireless device 121 or processing circuitry 710 is configured to, or may comprise the transmitting module 703 configured to, transmit the at least first and second symbol as a complete symbol according to the single- or multiple carrier modulation scheme without time domain separation.

In some embodiments, the wireless device 121 or processing circuitry 710 may further be configured, or may comprise the modulation module 703 being configured, such that no prefix or guard period is located between any of the at least first and second symbols and the at least first and second symbols are transmitted adjacent in time as a complete symbol according to the single- or multiple carrier modulation scheme.

In some embodiments, the wireless device 121 or processing circuitry 710 may further be configured to, or may comprise the modulation module 703 being configured to, provide at least one of the at least first and second symbols with a robust coding protection. In this case, according to some embodiments, the wireless device 121 or processing circuitry 710 may further be configured to, or may comprise the modulation module 703 being configured to, provide at least the first symbol with a robust coding protection.

In some embodiments, the wireless device 121 or processing circuitry 710 may further be configured, or may comprise the modulation module 703 being configured, such that guard intervals separating complete symbols according to the single- or multiple carrier modulation scheme in the time domain are a null-fix. In some embodiments, the wireless device 121 or processing circuitry 710 may further be configured, or may comprise the modulation module 703 being configured, such that the first and second parts of the signal comprise reference signal information. In some embodiments, the wireless device 121 or processing circuitry 710 may further be configured, or may comprise the modulation module 703 being configured, such that the first part of the signal comprise reference signal information and the second part of the signal comprise data and/or control information.

In some embodiments, the wireless device 121 or processing circuitry 710 may further be configured, or may comprise the modulation module 703 being configured, such that the reference information is reference signal information associated with beam scanning, and the control information is system information.

In some embodiments, the wireless device 121 or processing circuitry 710 may further be configured, or may comprise the modulation module 703 being configured, such that the complete symbol according to the single- or multiple carrier modulation scheme is an OFDM symbol. In some embodiments, the wireless device 121 or processing circuitry 710 may further be configured, or may comprise the modulation module 703 being configured, such that the complete symbol according to the single- or multiple carrier modulation scheme is a DFT-spread OFDM symbol.

The wireless device 121 further comprises a memory 720. The memory 720 may, for example, be used to store applications or programs to perform the methods herein and/or any information used by such applications or programs.

The embodiments herein for transmission of a signal according to a single- or multiple carrier modulation scheme in a wireless communications network 100 may be implemented through one or more processors 810 in the network node 110 depicted in FIG. 8, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 comprises a receiving module 801, or receiver RX, and a transmitting module 802, or transmitter TX, over which the network node 110 may transmit/receive signals to other communication nodes, such as, e.g. the wireless device 121 or other wireless devices or network nodes. Also, the network node 110 may comprise a modulation module 803 for performing the transmission of a signal according to a single- or multiple carrier modulation scheme in a wireless communications network 100 according to the embodiments herein.

Hence, network node 110 or processing circuitry 810 is configured to, or may comprise the modulation module 803 configured to, modulate at least a first part of the signal into at least a first symbol with a shorter duration than a complete symbol according to the single- or multiple carrier modulation scheme. Also, network node 110 or processing circuitry 810 is configured to, or may comprise the modulation module 803 configured to, modulate at least a second part of the signal into at least a second symbol with a shorter duration than a complete symbol according to the single- or multiple carrier modulation scheme, wherein the duration of the at least first and second symbols are equal to the duration of a complete symbol according to the single- or multiple carrier modulation scheme. Further, network node 110 or processing circuitry 810 is configured to, or may comprise the transmitting module 803 configured to, transmit the at least first and second symbol as a complete symbol according to the single- or multiple carrier modulation scheme without time domain separation.

In some embodiments, network node 110 or processing circuitry 810 may further be configured, or may comprise the modulation module 803 being configured, such that no prefix or guard period is located between any of the at least first and second symbols and the at least first and second symbols are transmitted adjacent in time as a complete symbol according to the single- or multiple carrier modulation scheme.

In some embodiments, network node 110 or processing circuitry 810 may further be configured to, or may comprise the modulation module 803 being configured to, provide at least one of the at least first and second symbols with a robust coding protection. In this case, according to some embodiments, network node 110 or processing circuitry 810 may further be configured to, or may comprise the modulation module 803 being configured to, provide at least the first symbol with a robust coding protection.

In some embodiments, network node 110 or processing circuitry 810 may further be configured, or may comprise the modulation module 803 being configured, such that guard intervals separating complete symbols according to the single- or multiple carrier modulation scheme in the time domain are a null-fix. In some embodiments, network node 110 or processing circuitry 810 may further be configured, or may comprise the modulation module 803 being configured, such that the first and second parts of the signal comprise reference signal information. In some embodiments, network node 110 or processing circuitry 810 may further be configured, or may comprise the modulation module 803 being configured, such that the first part of the signal comprise reference signal information and the second part of the signal comprise data and/or control information.

In some embodiments, network node 110 or processing circuitry 810 may further be configured, or may comprise the modulation module 803 being configured, such that the reference information is reference signal information associated with beam scanning, and the control information is system information.

In some embodiments, network node 110 or processing circuitry 810 may further be configured, or may comprise the modulation module 803 being configured, such that the complete symbol according to the single- or multiple carrier modulation scheme is an OFDM symbol. In some embodiments, network node 110 or processing circuitry 810 may further be configured, or may comprise the modulation module 803 being configured, such that the complete symbol according to the single- or multiple carrier modulation scheme is a DFT-spread OFDM symbol.

The network node 110 further comprises a memory 820. The memory 820 may, for example, be used to store applications or programs to perform the methods herein and/or any information used by such applications or programs. The network node 110 may further comprise an input/output interface (not shown), which may be used to communicate over a wired connection with other radio network entities or nodes in the wireless communications network 100.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

From the above it may be seen that the embodiments may further comprise a computer program product, comprising instructions which, when executed on at least one processor, e.g. the processors 710, 810, cause the at least one processor to carry out the method for enabling improved random access transmissions in a radio communications network 100. Also, some embodiments may, as described above, further comprise a carrier containing said computer program, wherein the carrier is one of an electronic signal, optical signal, radio signal, or computer readable storage medium.

The terminology used in the detailed description of the particular embodiments illustrated in the accompanying drawings is not intended to be limiting of the described communication node or method therein.

As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

Abbreviations

OFDM Orthogonal frequency division multiplexing
DFTS-OFDM DFT-spread OFDM modulation
FBMC Filter-Bank Multi-Carrier
FDMA Frequency-Domain Multiple Access
SC-FDMA Single-Carrier FDMA
CP Cyclic prefix
RE Resource element
RS Reference symbol
DFT Discrete Fourier transform FFT Fast (discrete) Fourier transform
BPSK Binary Phase Shift Keying
QPSK Quadrature Phase Shift Keying
QAM Quadrature amplitude modulation

The invention claimed is:

1. A method performed by a communication node for transmission of a signal according to one of a single and a multiple carrier modulation scheme in a wireless communications network, the method comprising:
   modulating at least a first part of the signal into at least a first symbol with a shorter duration than a complete symbol according to the one of the single and the multiple carrier modulation scheme, wherein the at least first part of the signal comprises reference signal information, and wherein the reference signal information is reference signal information associated with beam scanning;
   modulating at least a second part of the signal into at least a second symbol with a shorter duration than the complete symbol according to the one of the single and the multiple carrier modulation scheme, wherein the durations of the at least first and second symbols together are equal to a duration of the complete symbol according to the one of the single and the multiple carrier modulation scheme, wherein the at least second part of the signal comprises at least one of data and control information, and wherein the control information is system information; and
   transmitting the at least first and second symbols as the complete symbol according to the one of the single and the multiple carrier modulation scheme without time domain separation.

2. The method according to claim 1, wherein no prefix or guard period is located between any of the at least first and second symbols and wherein the at least first and second symbols are transmitted adjacent in time as the complete symbol according to the one of the single and the multiple carrier modulation scheme.

3. The method according to claim 1, further comprising:
   providing at least one of the at least first and second symbols with a robust coding protection.

4. The method according to claim 3, wherein providing the at least one of the at least first and second symbols with the robust coding protection includes providing the at least first symbol with the robust coding protection.

5. The method according to claim 1, wherein guard intervals separating complete symbols according to the one of the single and the multiple carrier modulation scheme in the time domain are a null-fix.

6. The method according to claim 1, wherein the complete symbol according to the one of the single and the multiple carrier modulation scheme is an Orthogonal Frequency Division Multiplexing (OFDM) symbol.

7. The method according to claim 1, wherein the complete symbol according to the one of the single and multiple carrier modulation scheme is a Discrete Fourier Transform (DFT)-spread Orthogonal Frequency Division Multiplexing (OFDM) symbol.

8. The method according to claim 1, wherein the communication node is one of a wireless device and a network node in the wireless communications network.

9. A communication node for transmission of a signal according to one of a single and a multiple carrier modulation scheme in a wireless communications network, the communication node comprising:
   at least one processor configured to:
      modulate at least a first part of the signal into at least a first symbol with a shorter duration than a complete symbol according to the one of the single and multiple carrier modulation scheme, wherein the at least first part of the signal comprises reference signal information, and wherein the reference signal information is reference signal information associated with beam scanning;
      modulate at least a second part of the signal into at least a second symbol with a shorter duration than the complete symbol according to the one of the single and the multiple carrier modulation scheme, wherein the durations of the at least first and second symbols together are equal to a duration of the complete symbol according to the one of the single and the multiple carrier modulation scheme wherein the at least second part of the signal comprises at least one of data and control information, and wherein the control information is system information; and
      transmit the at least first and second symbols as the complete symbol according to the one of the single and the multiple carrier modulation scheme without time domain separation.

10. The communication node according to claim 9, wherein no prefix or guard period is located between any of the at least first and second symbols and wherein the at least first and second symbols are transmitted adjacent in time as the complete symbol according to the one of the single and the multiple carrier modulation scheme.

11. The communication node according to claim 9, wherein the at least one processor is further configured to provide at least one of the at least first and second symbols with a robust coding protection.

12. The communication node according to claim 11, wherein the at least one processor is further configured to provide the at least first symbol with the robust coding protection.

13. The communication node according to claim 9, wherein guard intervals separating complete symbols according to the one of the single and the multiple carrier modulation scheme in the time domain are a null-fix.

14. The communication node according to claim 9, wherein the complete symbol according to the one of the single and the multiple carrier modulation scheme is an Orthogonal Frequency Division Multiplexing (OFDM) symbol.

15. The communication node according to claim 9, wherein the complete symbol according to the one of the single and the multiple carrier modulation scheme is a Discrete Fourier Transform (DFT)-spread Orthogonal Frequency Division Multiplexing (OFDM) symbol.

16. The communication node according to claim 9, wherein the communication node is one of a wireless device and a network node in the wireless communications network.

17. A non-transitory computer storage medium storing instructions which, when executed on at least one processor of a communication node, cause the at least one processor to carry out a method for transmission of a signal according to one of a single and a multiple carrier modulation scheme in a wireless communications network, the method comprising:
   modulating at least a first part of the signal into at least a first symbol with a shorter duration than a complete symbol according to the one of the single and the multiple carrier modulation scheme, wherein the at least first part of the signal comprises reference signal information, and wherein the reference signal information is reference signal information associated with beam scanning;

modulating at least a second part of the signal into at least a second symbol with a shorter duration than the complete symbol according to the one of the single and the multiple carrier modulation scheme, wherein the durations of the at least first and second symbols together are equal to a duration of the complete symbol according to the one of the single and the multiple carrier modulation scheme, wherein the at least second part of the signal comprises at least one of data and control information, and wherein the control information is system information; and transmitting the at least first and second symbols as the complete symbol according to the one of the single and the multiple carrier modulation scheme without time domain separation.

* * * * *